United States Patent
Sundberg et al.

(10) Patent No.: US 6,482,759 B1
(45) Date of Patent: Nov. 19, 2002

(54) MOLYBDENUM SILICIDE MATERIAL WITH HIGH STRENGTH

(75) Inventors: Mats Sundberg, Västerås (SE); Changhai Li, Angered (SE)

(73) Assignee: Sandvik AB, Sandviken (SE)

( * ) Notice: Subject to any disclaimer, the term of this patent is extended or adjusted under 35 U.S.C. 154(b) by 57 days.

(21) Appl. No.: 09/690,826

(22) Filed: Oct. 18, 2000

(51) Int. Cl.⁷ ................................................ C04B 35/58
(52) U.S. Cl. ........................ 501/96.3; 501/92; 501/103
(58) Field of Search ........................ 501/92, 96.3, 103

(56) References Cited

U.S. PATENT DOCUMENTS

| | | | |
|---|---|---|---|
| 4,970,179 A | * 11/1990 | Petrovic et al. | 501/92 |
| 5,063,182 A | * 11/1991 | Petrovic et al. | 501/96.3 |
| 5,382,553 A | * 1/1995 | Petrovic | 501/92 |
| 5,708,408 A | * 1/1998 | Sundberg | 38/306 |
| 5,990,025 A | * 11/1999 | Suyama et al. | 501/92 |

* cited by examiner

*Primary Examiner*—Karl Group
(74) *Attorney, Agent, or Firm*—Burns, Doane, Swecker & Mathis, L.L.P.

(57) ABSTRACT

Molybdenum silicide material with high strength at both room temperature and high temperatures, comprising a composite material, which is made from a mixture including $MoSi_2$ and $ZrO_2$. The mixture includes 5–30 vol-% $ZrO_2$ and 5–15 vol-% MoB, and the content of oxygen, in the form of $SiO_2$ on or in particles of $MoSi_2$, is below 0.5 weight-%. According to a further embodiment, the composite material comprises 3–35 vol-% SiC.

9 Claims, No Drawings

MOLYBDENUM SILICIDE MATERIAL WITH HIGH STRENGTH

FIELD OF THE INVENTION

The present invention relates to a molybdenum silicide material with high strength even at lower temperatures, such as at room temperature, and high strength at high temperatures, as well as good oxidation properties.

BACKGROUND OF THE INVENTION

Metallic materials have very good physical properties at lower temperatures, but have worse physical properties at higher temperatures. This is valid even for alloyed metallic material. In practice metallic materials cannot be used at temperatures higher than approximately 1100° C.

Ceramic materials such as SiC have good high temperature properties, but are for brittle in the whole range of temperatures.

Intermetallic materials, such as Ni-, Ti- and Fe-aluminides have good high temperature properties, but their practical application temperature is below 1000° C.

Silicides, such as molybdenum silicides, are attractive intermetallic materials with very good physical properties at high temperature. They have also very good oxidation and corrosion properties due to that a layer of glass is formed on the surface, which forms a protective film.

However, like most intermetallic materials, these have low ductility and low rupture strength at room temperature. The brittle-ductile transformation temperature (BDTT) for suicides is normally high, for instance above 1000° C. for $MoSi_2$. Below the transformation temperature suicides are extremely brittle and have low impact strength. Above the transformation temperature silicides outperform metals with regard to elongation properties and tension reducing properties. Since suicides undergo creep and plastic deformation above the transformation temperature, an increase in the strength at high temperatures should make them more competitive for applications at high temperature.

Different ways to increase RT (room temperature) hardness and HT (high temperature) strength of silicides have been tested. Thus, molybdenum silicide has been alloyed with V, Ti, Nb, Ta and Al in order to modify the microstructure and thereby increase the strength.

Further, $MoSi_2$—$ZrO_2$-composites have been studied. $ZrO_2$ has three well-defined crystalline conditions, namely monoklinisk (M), tetragonal (T), and cubic (C). The M-phase is stable up to 1170° C., where it will be transformed to the T-phase. The T-phase is stable up to 2370° C., whereafter the C-phase is stable up to the melting point of 2680° C. stabilizers in the form of $Y_2O_3$, MgO, CaO or $CeO_2$ have also been added to such materials. By the addition of such stabilizers, the material could be made tougher at a temperature below 1170° C.

However, corrosion and oxidation tests have shown that such materials have poorer properties than monolithic molybdenum silicide and material which is commercially available under the trademark KANTHAL SUPER.

SUMMARY OF THE INVENTION

The present invention solves the above-mentioned problems, and others, by providing a material having oxidation and corrosion properties which are comparable to monolithic molybdenum silicide or KANTHAL SUPER, but additional has high RT-$H_V$ and RT-$K_C$ values.

According to a first aspect, the present invention provides a composite material with high strength at both room temperature and high temperatures, the material comprising a mixture including $MoSi_2$; 5–30 vol-% $ZrO_2$; 5–15 vol-% MoB; and an oxygen content, in the form of $SiO_2$ on or in particles of $MoSi_2$, below 0.5 weight-%.

DETAILED DESCRIPTION OF THE INVENTION

The material of the present invention is a molybdenum silicide material with high strength at both room temperature and high temperatures, constituting a composite material, which material is made by a mixture comprising $MoSi_2$ and $ZrO_2$. The mixture additionally includes 5–30 vol-% $ZrO_2$, 5–15 vol-% MoB, and a content of oxygen, in the form of $SiO_2$ on or in particles of $MoSi_2$, below 0.5 weight-%.

The low content of oxygen gives a considerable additional toughness, but also greater hardness at room temperature. Further improvement is obtained if the content of oxygen is lowered to a level below approximately 0.35 weight-%. It appears impractible to substantially increase the toughness of the material if the content of oxygen significantly exceeds the above-mentioned values.

The oxygen in the form of $SiO_2$ on and in $MoSi_2$-particles reacts under sintering with $ZrO_2$ and forms $ZrSiO_4$. The $ZrSiO_4$ forms a layer around $ZrO_2$-particles, which lowers the tensile strength and thereby the strength of the material. Therefore it is a purpose to diminish the content of $ZrSiO_4$. At a content of oxygen of 0.36 weight-%, no $ZrSiO_4$ been detected with XRD (X-Ray-diffraction).

According to another embodiment the composite material comprises 10–30 vol-% $ZrO_2$.

MoB improves the properties of the formed oxides inasmuch as the viscosity is altered and thereby a much more uniform oxide layer is formed which effectively protects material against corrosion. MoB also contributes to the increased material hardness.

According to a preferred embodiment, the composite material contains 8–12 vol-% MoB.

Besides, it is advantageous to use unstabilized $ZrO_2$, which gives rise to a volume increase when the phase is transformed from said T-phase to said M-phase. The increase of the volume is 3–5 vol-%. This increase of the volume can produce micro cracks, which provide additional toughness at room temperature.

A material of $MoSi_2$, $ZrO_2$ and MoB alone still processes rather poor rupture properties at high temperatures.

According to a further preferred embodiment, a composite material of the invention further comprises 5–35 vol-% SiC. Alternatively, preferably the material comprises 3–10 vol-% sic.

Approximately 3–5 vol-% SiC can provide high rupture strength and a low creep rate at high temperatures.

SiC can be added as compound, but it is advantageous that SiC be formed by the carbon powder added to the composite material before sintering, and the SiC is formed in-situ during the sintering procedure.

In order to obtain the SiC it is preferred that the composite material includes 0–3 weight-% C in the form of carbon-powder, before sintering.

By the addition of carbon-powder, C will react with $MoSi_2$ to form $Mo_5Si_3$ and SiC.

With regard to the content of oxygen, the benefits provided by the low oxygen content are substantial when material comprises SiC, as well as when SiC is not found.

The same levels of hardness and toughness are obtained with material without SiC. However, with a material having SiC, better creep properties at high temperatures and a two-fold increase of the ultimate strength under about 1100–1300° C. are obtained when compared to a material without SiC.

$MoSi_2$ constitutes the balance of the material. According to a preferred embodiment $MoSi_2$ will be found together with one or more of the alloying elements V, Ti, Zr, Ta or Al, where the alloying elements totally amount to 0–3 atomic-% of the amount of $MoSi_2$.

Below is an exemplary composition of a material according to the invention:

70 vol-% $MoSi_2$ (content of oxygen 0.36 weight-%; 2.0 $m^2/g$)

20 vol-% $ZrO_2$ 10 vol-% MoB 1 weight-% C

After sintering the composite material according to the invention will contain $MoSi_2$, MoB, $Mo_5Si_3$, $ZrO_2$, SiC and possibly $ZrSiO_4$.

This gives, by sintering without pressure at 1700° C., a material with a density of 6.32 $g/cm^3$. The material has hardness at room temperature of RT-$H_V$ of 9.60+/−0.15 GPa and toughness at room temperature of RT-$K1_C$ of 7.69+/−0.32 $Mpam^{1/2}$.

By use of so-called Hot Isostatic Pressing the hardness can further be increased.

While the present invention has been described by reference to the above-mentioned embodiments, certain modifications and variations will be evident to those of ordinary skill in the art. Therefore the present invention is to limited only by the scope and spirit of the appended claims.

What is claimed is:

1. A composite material with high strength at both room temperature and high temperatures, the material made by sintering a mixture comprising: $MoSi_2$; 5–30 vol-% $ZrO_2$; 5–15 vol-% MoB; and an oxygen content, in the form of $SiO_2$ on or in particles of $MoSi_2$, below 0.5 weight-%.

2. The material according to claim 1, comprising 8–12 vol-% MoB.

3. The material according to claim 1, wherein the mixture comprises 10–30 vol-% $ZrO_2$.

4. The material according to claim 1, wherein the $ZrO_2$ is unstabilized.

5. The material according to claim 1, wherein the mixture further comprises 3–35 vol-% SiC.

6. The material according to claim 5, wherein the material comprises 3–10 vol-% SiC.

7. The material according to claim 5, wherein the SiC is formed in-situ during sintering by carbon powder added to the mixture before sintering.

8. The material according to claim 5, wherein the mixture comprises an amount up to 3 weight-% C in the form of carbon powder.

9. The material according to claim 1, wherein a balance of the material is constituted by $MoSi_2$ together with one or more of alloying elements V, Ti, Zr, Ta or Al, where the alloying elements constitute a total of up to 3 atom-% of the amount of $MoSi_2$.

* * * * *